US012694785B2

(12) United States Patent
Kellari

(10) Patent No.: US 12,694,785 B2
(45) Date of Patent: Jul. 28, 2026

(54) INTELLIGENT ROAD BARRIER SYSTEM

(71) Applicant: Cavnue Technology, LLC, Arlington, VA (US)

(72) Inventor: Demetrios Vasili Kellari, Brooklyn, NY (US)

(73) Assignee: Cavnue Technology, LLC, Arlington, VA (US)

( * ) Notice: Subject to any disclaimer, the term of this patent is extended or adjusted under 35 U.S.C. 154(b) by 39 days.

(21) Appl. No.: 18/157,867

(22) Filed: Jan. 23, 2023

(65) Prior Publication Data

US 2023/0237905 A1     Jul. 27, 2023

Related U.S. Application Data

(60) Provisional application No. 63/303,705, filed on Jan. 27, 2022, provisional application No. 63/303,771, filed on Jan. 27, 2022.

(51) Int. Cl.
*G08G 1/0967* (2006.01)
*B60W 60/00* (2020.01)
(Continued)

(52) U.S. Cl.
CPC ..... *G08G 1/096783* (2013.01); *B60W 60/001* (2020.02); *G08G 1/0116* (2013.01);
(Continued)

(58) Field of Classification Search
CPC ........ G08G 1/0967; G08G 1/01; G08G 1/095; B60W 60/00
See application file for complete search history.

(56) References Cited

U.S. PATENT DOCUMENTS 8,852,195 B2 * 10/2014 Justin ........................ A61F 2/38
606/87
10,019,904 B1 * 7/2018 Chan .................. G06Q 10/0635
(Continued)

FOREIGN PATENT DOCUMENTS

CA          3068251          3/2023
CN      110765959 A      2/2020
(Continued)

OTHER PUBLICATIONS

U.S. Appl. No. 17/210,099, Clifford, filed Mar. 23, 2021.
(Continued)

*Primary Examiner* — David P. Merlino
*Assistant Examiner* — Mahmoud M Kazimi
(74) *Attorney, Agent, or Firm* — Fish & Richardson P.C.

(57)          ABSTRACT

Implementations for an intelligent road barrier (IRB) system can include a plurality of road barriers located along a roadway, and a plurality of IRB kits, each IRB kit being including a set of sensors configured to obtain sensor data representative of at least a portion of a road state of the roadway proximate to the respective road barrier, a data processing unit configured to process at least a portion of the sensor data, a communication unit configured to send at least a portion of the sensor data and to receive sensor data from the one or more other IRB kits, and a state conveyance system configured to convey at least a portion of road state data to one or more vehicles associated with the roadway, the at least a portion of road state data being determined based on the at least a portion of the sensor data.

20 Claims, 3 Drawing Sheets

(51) Int. Cl.

| | |
|---|---|
| *E01F 15/00* | (2006.01) |
| *G08G 1/01* | (2006.01) |
| *G08G 1/095* | (2006.01) |
| *H04L 67/12* | (2022.01) |

(52) U.S. Cl.

CPC ......... *G08G 1/0141* (2013.01); *G08G 1/0145* (2013.01); *G08G 1/095* (2013.01); *G08G 1/096725* (2013.01); *B60W 2552/10* (2020.02); *B60W 2552/50* (2020.02); *B60W 2556/45* (2020.02); *E01F 15/00* (2013.01); *H04L 67/12* (2013.01)

(56) References Cited

U.S. PATENT DOCUMENTS

| | | | |
|---|---|---|---|
| 10,037,689 B2 * | 7/2018 | Taylor .................. G05D 1/0285 |
| 10,403,150 B1 | 9/2019 | Nepomuceno et al. |
| 10,991,242 B2 | 4/2021 | Taylor |
| 11,138,873 B1 | 10/2021 | Clifford |
| 12,002,357 B2 | 6/2024 | Clifford et al. |
| 2004/0145496 A1 | 7/2004 | Ellis |
| 2012/0146763 A1 | 6/2012 | Teti et al. |
| 2014/0195068 A1 | 7/2014 | Boss et al. |
| 2016/0189542 A1 * | 6/2016 | Myer .............. G08G 1/096783 340/905 |
| 2016/0293003 A1 | 10/2016 | Ng et al. |
| 2017/0050638 A1 | 2/2017 | Gordon et al. |
| 2017/0213458 A1 | 7/2017 | Gordon et al. |
| 2017/0286784 A1 | 10/2017 | Bhatia et al. |
| 2019/0132709 A1 | 5/2019 | Graefe et al. |
| 2019/0236382 A1 | 8/2019 | Hall et al. |
| 2019/0236949 A1 | 8/2019 | Agarwal |
| 2019/0352869 A1 | 11/2019 | Gupta |
| 2019/0381997 A1 | 12/2019 | Skokan |
| 2019/0392712 A1 | 12/2019 | Ran et al. |
| 2020/0242922 A1 | 7/2020 | Dulberg et al. |
| 2020/0327812 A1 * | 10/2020 | Ran .................. G08G 1/096783 |
| 2021/0020040 A1 | 1/2021 | Bradley |
| 2021/0035443 A1 | 2/2021 | Young et al. |
| 2021/0049901 A1 | 2/2021 | Young et al. |
| 2021/0097854 A1 * | 4/2021 | Guim Bernat .......... G07C 5/06 |
| 2021/0157330 A1 | 5/2021 | Tran |
| 2021/0318691 A1 | 10/2021 | Amini et al. |
| 2021/0404130 A1 | 12/2021 | Provaznik |
| 2022/0148419 A1 | 5/2022 | Lepp |
| 2022/0208007 A1 | 6/2022 | Arora |
| 2022/0222587 A1 | 7/2022 | Li et al. |
| 2022/0252424 A1 | 8/2022 | Zhang |
| 2022/0284627 A1 | 9/2022 | Johnson et al. |
| 2022/0327183 A1 | 10/2022 | Russo et al. |
| 2023/0039738 A1 | 2/2023 | Beaurepaire et al. |
| 2023/0092432 A1 | 3/2023 | Clifford et al. |
| 2023/0182747 A1 | 6/2023 | Kobayashi et al. |
| 2023/0186870 A1 | 6/2023 | Cristache |
| 2023/0222907 A1 | 7/2023 | Clifford et al. |
| 2023/0237900 A1 | 7/2023 | Kellari |
| 2023/0237902 A1 | 7/2023 | Kellari |
| 2023/0266756 A1 | 8/2023 | Wengreen et al. |
| 2023/0271556 A1 | 8/2023 | Kobashi et al. |
| 2025/0267599 A1 * | 8/2025 | Bandi ..................... H04W 4/40 |

FOREIGN PATENT DOCUMENTS

| | | |
|---|---|---|
| CN | 111472298 A | 7/2020 |
| DE | 102013200381 A1 | 7/2014 |
| GB | 2602391 | 6/2022 |
| KR | 102515036 B | 3/2023 |
| WO | WO 2022080146 A | 4/2022 |

OTHER PUBLICATIONS

U.S. Appl. No. 17/476,800, Clifford et al., filed Sep. 16, 2021.

International Search Report and Written Opinion in International Appln. No. PCT/US2023/011575, mailed on Apr. 24, 2023, 17 pages.

U.S. Appl. No. 18/159,771, Kellari, filed Jan. 26, 2023.

Hu et al., "A multirange vehicle speed prediction with application to model predictive control-based integrated power and thermal management of connected hybrid electric vehicles," Journal of Dynamic Systems, Measurement, and Control, Jan. 2022, 144(1):011105, 11 pages.

International Preliminary Report on Patentability in International Appln. No. PCT/US2023/011571, mailed on Aug. 8, 2024, 9 pages.

International Preliminary Report on Patentability in International Appln. No. PCT/US2023/011575, mailed on Aug. 8, 2024, 11 pages.

International Preliminary Report on Patentability in International Appln. No. PCT/US2023/011673, mailed on Aug. 8, 2024, 6 pages.

International Search Report and Written Opinion in International Appln. No. PCT/US2022/050718, mailed on Mar. 6, 2023, 18 pages.

International Search Report and Written Opinion in International Appln. No. PCT/US2023/011571, mailed on May 17, 2023, 15 pages.

International Search Report and Written Opinion in International Appln. No. PCT/US2023/011673, mailed on Apr. 19, 2023, 12 pages.

\* cited by examiner

INTELLIGENT ROAD BARRIER SYSTEM

CROSS-REFERENCE TO RELATED APPLICATION

This application claims priority to and the benefit of U.S. Prov. App. Nos. 63/303,705 and 63/303,771, filed Jan. 27, 2022, each of which is expressly incorporated herein by reference in the entirety for all purposes.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

Implementations of the present disclosure are directed to an intelligent road barrier (IRB) system. More particularly, implementations of the present disclosure are directed to an IRB system that includes a set of IRB kits, each IRB kit being configured for attachment to a road barrier to enable data collection and communication for determining and communicating road states.

In some implementations, an IRB system includes a plurality of road barriers located along a roadway, and a plurality of IRB kits, each IRB kit being removably attached to a respective road barrier and including: a set of sensors configured to obtain sensor data representative of at least a portion of a road state of the roadway proximate to the respective road barrier, a data processing unit configured to process at least a portion of the sensor data, a communication unit configured to send at least a portion of the sensor data to one or more other IRB kits and to receive sensor data from the one or more other IRB kits, and a state conveyance system configured to convey at least a portion of road state data to one or more vehicles associated with the roadway, the at least a portion of road state data being determined based on the at least a portion of the sensor data. Other implementations of this aspect include corresponding systems, apparatus, and computer programs, configured to perform the actions of the methods, encoded on computer storage devices.

These and other implementations can each optionally include one or more of the following features: the set of sensors includes one or more of a light detection and ranging (LIDAR) system, a microphone, a camera, a hyper-spectrum camera, a radar, a Bluetooth system, a Wi-Fi system, a thermometer, a barometer, and a precipitation sensor; the road state data is representative of the road state of the roadway and comprises respective states of agents on the roadway; the road state data is representative of the road state of the roadway and includes a state of the roadway; the data processing unit is configured to determine at least a portion of the road state based on the sensor data within a predetermined period of time; the IRB system further includes a control and orchestration system provisioned as a cloud-based system and configured to coordinate temporal-spatial sensor information of the sensor data obtained by sensors of the plurality of IRB kits, determine second data representative of a road state determined based on the sensor data, and sending the second data to the communication unit of a particular IRB kit of the plurality of IRB kits; at least one IRB kit includes a power unit configured to supply power for the at least one IRB kit; the power unit includes a power cable and the communication unit includes a wired communication device, and the power cable and the wired communication device are microtrenched below or within the respective road barrier; the power unit includes a solar panel and a battery; two or more of the IRB kits communicate with one another to form a mesh network; the state conveyance system includes a short-range communication device configured to transmit the at least a portion of road state data to a vehicle on the roadway; the communication unit is configured to receive information from a vehicle traveling on the roadway; and the road state includes a configuration of the roadway, the configuration indicating at least one dedicated lane of the roadway, the at least one dedicated lane for travel of one or more of autonomous vehicles and semi-autonomous vehicles.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
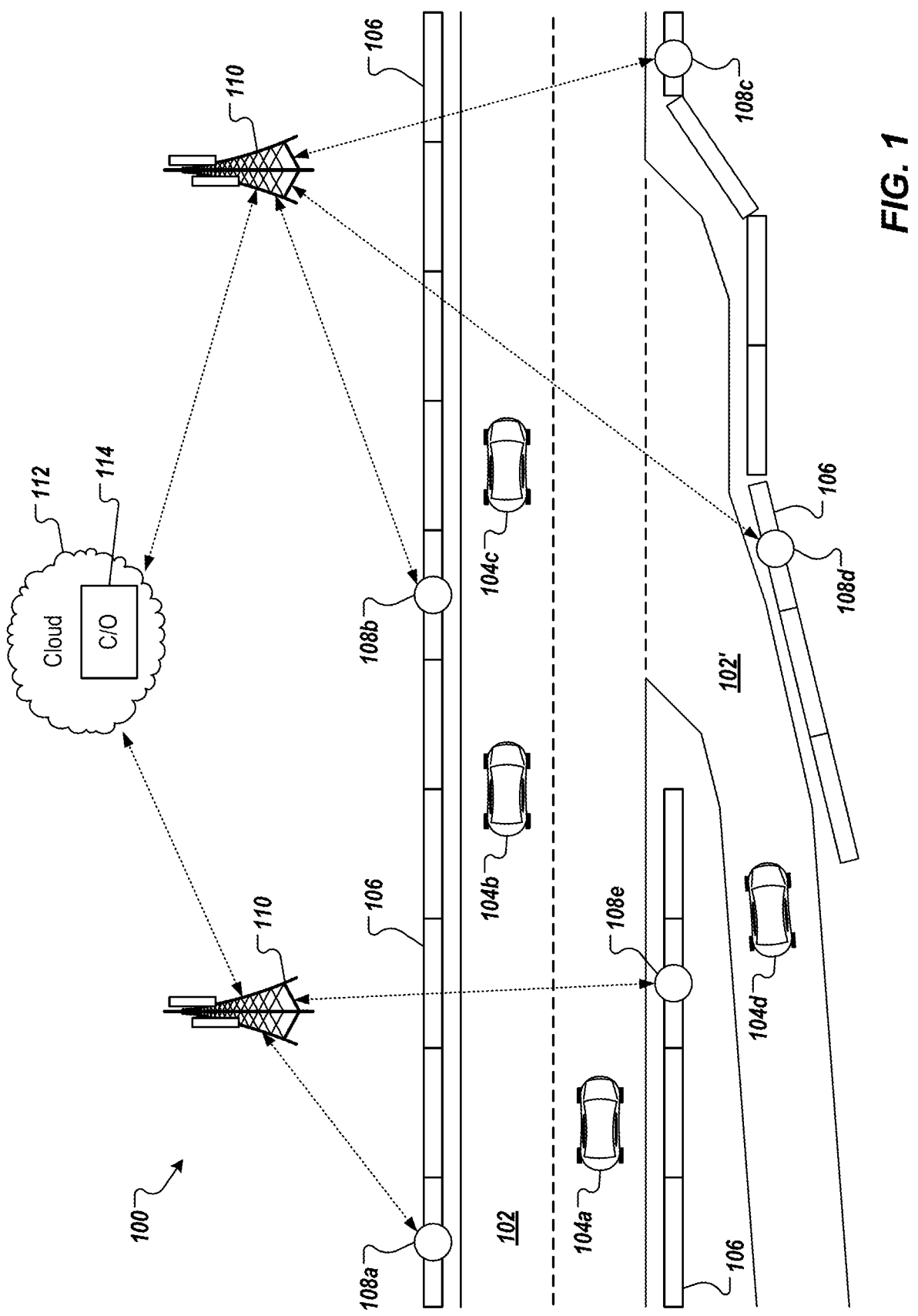
FIG. 1 depicts an example architecture that includes an intelligent road barrier (IRB) system in accordance with implementations of the present disclosure.

Implementations of the present disclosure are directed to an intelligent road barrier (IRB) system. More particularly, implementations of the present disclosure are directed to an IRB system that includes a set of IRB kits, each IRB kit being configured for attachment to a road barrier to enable data collection and communication for determining and communicating road states. IRB kits can be selectively detached from road barriers for replacement, movement, and/or reconfiguration of the IRB system.

Implementations of an IRB system include a plurality of road barriers located along a roadway, and a plurality of IRB kits, each kit being removably attached to a respective road barrier and including: a set of sensors configured to obtain sensor data representative of at least a portion of a road state of the roadway proximate to the respective road barrier, a data processing unit configured to process at least a portion of the sensor data, a communication unit configured to send at least a portion of the sensor data to one or more other IRB kits and to receive sensor data from the one or more other IRB kits, and a state conveyance system configured to convey at least a portion of road state data to one or more vehicles associated with the roadway, the at least a portion of road state data being determined based on the at least a portion of the sensor data.

To provide further context for implementations of the present disclosure, and as introduced above, vehicles can travel on surface streets, highways, backroads, and the like (collectively referred to herein as roads or roadways) to their destination. In many cases, a vehicle can travel along a roadway with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

Electronic equipment can be installed along roadways to assist in collection of data and perform other functionality. For example, commonly assigned U.S. application Ser. No. 17/210,099, filed on Mar. 23, 2021, and entitled Road Element Sensors and Identifiers, and commonly assigned U.S. application Ser. No. 17/476,800, filed on Sep. 16, 2021, and entitled Intelligent Entry and Egress for Dedicated Lane, each of which is expressly incorporated herein by reference in the entirety for all purposes, discuss example equipment that can assist in collection of data relevant to roadways and vehicles traveling along roadways.

Areas along and adjacent to roadways, however, can become congested. For example, traffic signs, road barriers, gantries, lights, and other equipment compete for space under constraints, such as safety, accessibility, and the like. Further, even with space available, installing electronic equipment can be a resource-consuming task. For example, foundations and/or anchoring systems to attach the electronic equipment to need be installed. Such foundations and/or anchoring systems can include permanent structures that remain, even if the electronic equipment they were built for is removed. Also, roadways and traffic along roadways can change over time. Consequently, electronic equipment may need to be supplemented and/or moved to accommodate changes.

In view of the above context, implementations of the present disclosure provide an IRB system that includes a set of IRB kits that can be integrated in or attached to road barriers. In some examples, each IRB kit is configured to mount to or be integrated into a road barrier and includes data collection and processors to collect data that can be used to determine one or more road states of a roadway proximate to the road barriers and to communicate road state information. For example, each IRB kit can communicate road state information to one or more agents (e.g., vehicles) traveling on the roadway, such that the agents can make intelligent manual driving, autonomous driving, or semi-autonomous driving decisions. In some examples, each IRB kit communicates road state information to one or more other IRB kits.

In some implementations, a road state can include a set of sub-states that collectively define a comprehensive state of at least a portion of a roadway. Example sub-states can include, without limitation, an agent sub-state, an infrastructure sub-state, and an environment sub-state. In some examples, the agent sub-state represents a state of one or more agents traveling on or otherwise located within proximity of the roadway. Example agents can include, without limitation, drivers, vehicles, pedestrians, animals, and foreign objects (e.g., debris on the roadway, an object falling from a vehicle). The state of a vehicle can include, without limitation, the location, direction, velocity, acceleration, size of the vehicle, and the like. The state of a foreign object or an animal can include the size, location, direction and velocity (e.g., if the foreign object or the animal is moving), and the like. The state of the infrastructure can include, without limitation, a state of repair of the road surface (e.g., defects such as potholes, cracks), coefficient of friction of the road surface (e.g., dampness, iciness, dryness), location of road markings, and temporary structures (e.g., work zones, detours, cones). The state of the environment can include, without limitation, meteorological characteristics such as temperature, pressure, wind speed, rain, snow, ice, fog, sun angle (e.g., sun angle at sunrise or sunset where the sunlight might directly shine into a driver's eyes), haze, illuminance, and the like. In some examples, the meteorological status can include a binary status of a characteristic (e.g., rain or no rain). In some examples, the meteorological status can include an intensity of a characteristic within a range (e.g., [0, 1], where 0 indicates lowest intensity, 1 indicates highest intensity).

As described in further detail herein, implementations of the present disclosure can be provisioned with or within roadway-related systems such as those disclosed in commonly assigned U.S. application Ser. Nos. 17/210,099 and 17/476,800 introduced above. For example, the set of IRB kits can be used to configure a roadway to include a dedicated lane and selectively enable movement of vehicles between the dedicated lane and one or more other types of lanes, discussed in further detail herein.

FIG. 1 depicts an example architecture that includes an IRB system 100 in accordance with implementations of the present disclosure. The example architecture includes a roadway 102, along which vehicles 104a, 104b, 104c, 104d travel. In the example of FIG. 1, the IRB system 100 includes road barriers 106, IRB kits 108a, 108b, 108c, 108d, 108e, each of which is mounted to or integrated with a respective road barrier 106. In some examples, one or more telecommunications towers 110 (e.g., representing at least a portion of a cellular network) enable communication with a cloud-based system 112. In the example of FIG. 1, the cloud-based system 112 hosts a control and orchestration (C/O) system 114.

In some examples, the road barriers 106 can be any appropriate type of road barriers, such as, for example and without limitation, continuous (e.g., jersey barriers) or discrete barriers (e.g., delineator posts or bollards). In some examples, the road barriers 106 can be made of concrete, metal, plastic, and/or any other appropriate material. The road barriers can be placed on the roadway 102, which generally functions as a general-purpose roadway, such that a section of the roadway (e.g., a lane of the road) can operate as an intelligent section that provides advanced road operations enabled by the IRB system 100 of the present disclosure. For example, and as represented as a non-limiting example in FIG. 1, the road barriers 106 can be installed in a section of the roadway 102 that includes an on-ramp 102' that vehicles (e.g., the vehicle 104d) will accelerate along to eventually merge into traffic on the roadway 102. In some examples, the road barriers 106 can be moved or replaced and reconfigured, for example, in response to changes to the roadway 102.

As depicted in FIG. 1, each IRB kit 108a, 108b, 108c, 108d, 108e is attached to or integrated with a respective road barrier 106 located along a roadway. As described in further detail herein, each IRB kit 108a, 108b, 108c, 108d, 108e is operable to collect data representative of one or more characteristics associated with the roadway 102 (e.g., agent characteristics, infrastructure characteristics, environment characteristics), processing of data, communication of data (e.g., to one or more agents, to one or more other IRB kits, to the C/O system 114), and communication of road state information (e.g., to one or more agents, to one or more other IRB kits, to the C/O system 114).

In some implementations, each IRB kit 108a, 108b, 108c, 108d, 108e can send data generated by one or more sensors to the C/O system 114. The C/O system 114 can process and analyze the data, determine a road state of the roadway 102 based on the data, and send road state information to one or more of the IRB kits 108a, 108b, 108c, 108d, 108e of the IRB system 100 and/or one or more of the vehicles 104a, 104b, 104c, 104d. For example, in system-level optimization use cases, the IRB system 100 can aggregate sensor data from multiple sensors and send the aggregated sensor data to the C/O system 114. The C/O system 114 can synchronize and coordinate between the sensor data collected by different sensors at the system level. For example, the C/O system 114 can be configured to process the sensor data obtained by the sensors of different IRB kit 108a, 108b, 108c, 108d, 108e and to coordinate temporal-spatial information of the sensor data.

Generally, the vehicles 104a, 104b, 104c, 104d can move along or traverse the roadway 102 and can decide whether to use a general-purpose lane or a dedicated lane, if any. For example, one or more of the vehicles 104a, 104b, 104c, 104d moving along a general-purpose lane can be informed of a dedicated lane entry point at a set distance prior to the beginning of a transition lane (e.g., transition from the general-purpose lane to the dedicated lane). In some examples, the roadway 102 can include an opening lane to allow vehicles to merge into a transition lane. Each vehicle 104a, 104b, 104c, 104d can determine (e.g., using an on-board artificial intelligence) to access the dedicated lane by moving into an opening lane and subsequently into the transition lane. In another example, a driver of one of the vehicles 104a, 104b, 104c, 104d can decide to access the dedicated lane by viewing a display located at the set distance prior to the beginning of the transition lane and make the decision to move into the opening lane and subsequently into the transition lane.

A general-purpose lane can correspond to a lane that is driven on by the public without any restrictions or tolls. For example, the general-purpose lane can include a lane that a driver can drive freely towards their destination. An opening lane can correspond to a lane that enables vehicles to move between a general-purpose lane and a transition lane. A transition lane can correspond to a lane that enables a vehicle to approach a dedicated lane. A dedicated lane can correspond to a lane that enables the vehicle with special access following meeting conditions or criteria determined by the IRB system 100.

In some implementations, the C/O system 114 can generate a roadway configuration that includes one or more dedicated lanes and that enables access and egress to the one or more dedicated lanes in the IRB system 100. The roadway configuration can enable both autonomous, semi-autonomous, and human controlled vehicles to access the dedicated lanes. In some examples, the specific roadway configuration of lanes can enable one or more vehicles to enter the dedicated lanes with minimal disruption to surrounding vehicles, neighboring vehicles, or vehicles already driving within the dedicated lanes. For example, the C/O system 114 can assess road state to selectively modify lane designations of the roadway 102 to generate a roadway configuration that enables access and egress to the dedicated lanes. In some examples, the C/O system 114 can generate a new roadway configuration for enabling access and egress to dedicated lanes. In some examples, the C/O system 114 can change designation of a lane from general-purpose to dedicated or from dedicated to general-purpose in response to road state information.

In further detail, the C/O system 114 can generate roadway configurations that include various lane designations and characteristics. The various lane designations can include general-purpose lanes, opening lanes, transition lanes, and dedicated lanes. In some examples, the number of each designated lane for the roadway configuration may vary depending on the number of lanes available on the roadway 102. For example, the number of lanes along a section of the roadway 102 can range from 1 to n, where n is an integer that is greater than 1. In some examples, a minimum number of general-purpose lanes can be required. For example, if a section of the roadway 102 includes two lanes and the minimum number of general-purpose lanes is two, no lane can be designated as a dedicated lane for the section. As another example, if a section of the roadway 102 includes three lanes and the minimum number of general-purpose lanes is two, one lane can be designated as a dedicated lane for the section.

In some examples, the C/O system 114 can determine a number of characteristics associated with each lane of the roadway 102. Example characteristics can include, without limitation, a length of a lane, a width of a lane, a number of turns for each lane, and an angle of the turns for each lane. The C/O system 114 can configure these lanes using the various characteristics. The C/O system 114 can generate the roadway configuration with the various characteristics based on obtained sensor data, historical data, vehicular data, and other roadway configuration data.

In some examples, for the C/O system 114 to generate roadway configurations, the C/O system 114 can analyze road state information, which, among other features, can represent the positions, movements, and other characteristics of vehicles and/or other agents along one or more prior configured roadways. For example, the C/O system 114 can analyze characteristics of vehicles driving on the prior roadways to determine a specific geometric roadway configuration that enables vehicles to access and egress dedicated lanes. In some examples, the IRB system 100 can generate and monitor sensor data over time to describe characteristics of the agents (road actors) along certain points of the prior configured roadways. For example, the C/O system 114 can acquire from prior roadways configured with sensors: (i) observations of prevailing speeds of vehicles in general purpose lanes; (ii) observations of historic speeds of vehicles along a roadway; (iii) observations of vehicle dynamics; and, (iv) observations of sensor fields of view to ensure vehicles are properly seen at each portion along the configured roadway. The C/O system 114 can obtain sensor data from sensors monitoring the one or more prior configured roadways. Based on the sensor data, the C/O system 114 can generate a specific geometric configuration of a new roadway that enables vehicles in traffic to divert from the general-purpose lane to access and egress one or more dedicated lanes.

In some examples, after the C/O system 114 has generated and deployed the roadway configuration (e.g., by way of construction of the newly generated roadway configuration or another form of deployment), the IRB system 100 can monitor aspects and characteristics of vehicles in the configured roadway to allow for entry and exiting into the one or more dedicated lanes based on the IRB kits 108a, 108b, 108c, 108d, 108e positioned along the configured roadway. The IRB kits 108a, 108b, 108c, 108d, 108e can be deployed in a longitudinal manner along the roadway 102 to monitor the vehicles, their position, and their movement amongst other vehicles.

As described in further detail herein, the IRB kits 108a, 108b, 108c, 108d, 108e can generate observations regarding agents moving in the configured general-purpose lane, the opening lane, the transition lane, and the dedicated lane. In some examples, the IRB kits 108a, 108b, 108c, 108d, 108e can determine other characteristics about vehicular traffic in their corresponding fields of view (e.g., vehicle density per unit area, vehicle congestion, vehicle headway, vehicle dynamics). For example, the IRB kits 108a, 108b, 108c, 108d, 108e can each identify an object as the object enters its field of view. Based on the identification of the object, the IRB kits 108a, 108b, 108c, 108d, 108e can further describe a location of the vehicles along the configured roadway, a speed of the vehicle, a relationship between vehicles (e.g., vehicle headway describing distance and time between two moving vehicles), and others, to name a few examples.

Figure 2:
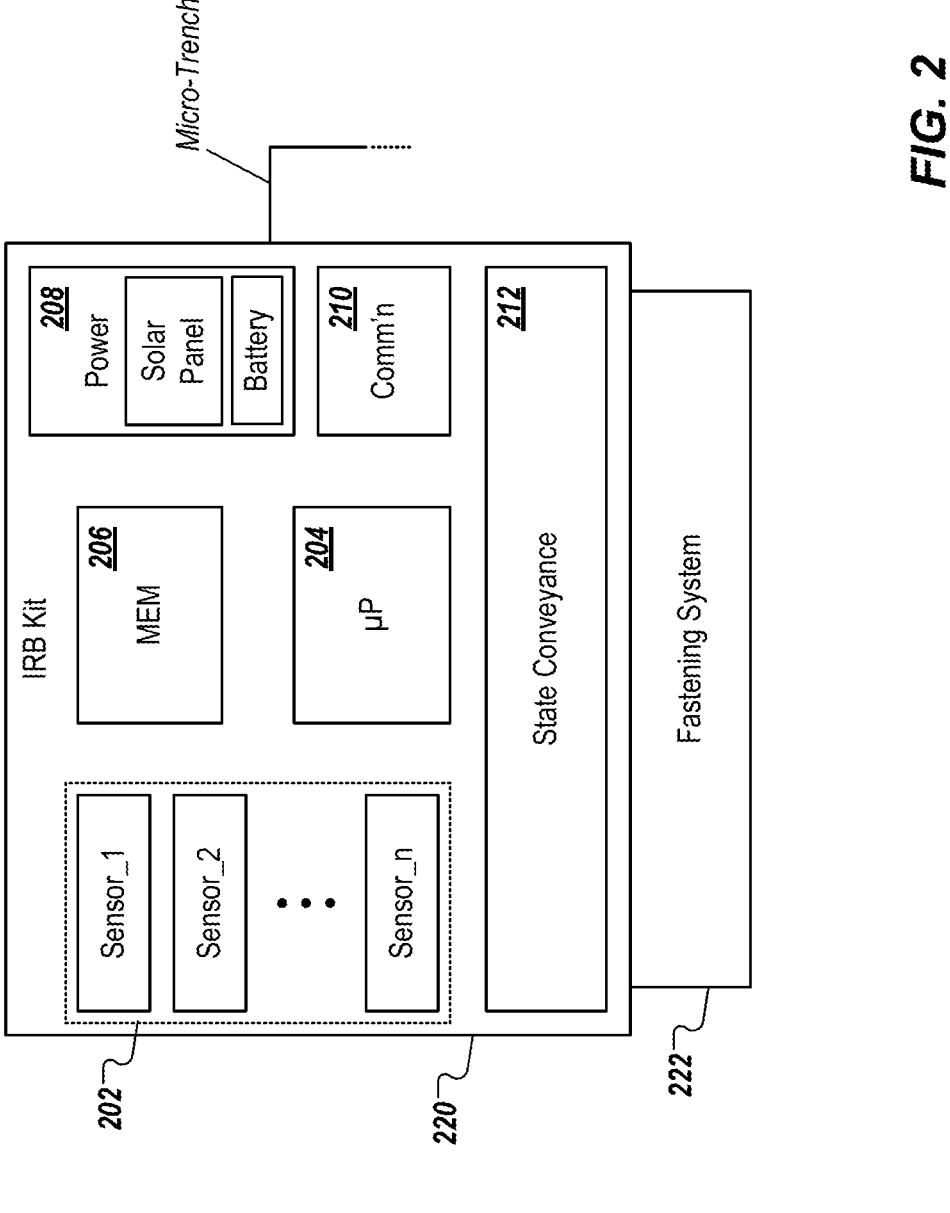
FIG. 2 depicts an example IRB kit in accordance with implementations of the present disclosure.

FIG. 2 depicts an example IRB kit 200 in accordance with implementations of the present disclosure. The example IRB kit 200 can be representative of one or more of the IRB kits 108a, 108b, 108c, 108d, 108e of FIG. 1. In the example of FIG. 2, the example IRB kit 200 includes a set of sensors 202, one or more processors 204, memory (e.g., non-volatile memory), a power unit 208, and a communication unit 210. The IRB kit 200 of FIG. 2 also includes a state conveyance system 212.

As depicted in FIG. 2, the IRB kit 200 includes a housing 220 and a fastening system 222. The set of sensors 202, the one or more processors 204, the memory 206, the power unit 208, and the transmitter/receiver 210 are housed in the housing 220. The fastening system 222 can include any appropriate fastening configuration that enables the IRB kit 200 to be attached to or integrated within a barrier. For example, and without limitation, the fastening system 222 can include a clamp that enables the IRB kit 200 to be clamped to a barrier and/or can include one or more fasteners (e.g., screws, bolts) that enable the IRB kit 200 to be fastened to a barrier. In some examples, the fastening system 222 enables the IRB kit 200 to be unclamped/unfastened from the barrier (e.g., to move the IRB kit 200 to another location).

In some examples, IRB kits of an IRB system can have different capabilities. For example, a first IRB kit can have more processing power and/or memory of one or more second IRB kits. For example, the first IRB kit can receive sensor data from one or more of the second IRB kits and can determine, based on the sensor data, the road state for the IRB kits, as a whole. The first IRB kit can send the road state to the one or more second IRB kits. For example, the first IRB kit can be more suitable for processing sensor data than the second IRB kits (e.g., having more processors with faster processing speed, more memory, more advanced algorithms, etc.) and the first IRB kit can do heavy computation for the second IRB kits. As another example, the first IRB kit can be absent a state conveyance system, while the one or more second IRB kits can each include a state conveyance system. For example, the second IRB kits can convey road state information (e.g., to agents), while the first IRB kit cannot. As another example, the first IRB kit can include a first type of state conveyance system, while the one or more second IRB kits can each include a second type of state conveyance system. For example, the first IRB kit can convey road state information (e.g., to agents) in a first manner according to the first type of state conveyance system, while the second IRB kits can convey road state information (e.g., to agents) in a second manner according to the second type of state conveyance system.

Referring again to FIG. 2, the set of sensors 202 can include any appropriate type of sensor. Example sensors can include, without limitation, a light detection and ranging (LIDAR) system, a microphone, a camera (e.g., that generates still images and/or video), a hyper-spectrum camera (e.g., that senses light that is beyond visual light spectrum), a radar, a Bluetooth system, a Wi-Fi system, thermometer, barometer, and precipitation sensor. In general, each sensor in the set of sensors 202 is responsive to the roadway, the environment of the roadway, and/or agents of the roadway, and generates data based thereon. The sensors can, for example, generate observations regarding agents moving in general-purpose lanes, opening lanes, transition lanes, on-ramps, dedicated lanes, and the like.

In some implementations, the one or more processing units 204 are configured to provide instructions to transmit data to and receive data from one or more of the C/O system 114 and/or one or more other IRB kits 200. For example, the one or more processing units 204 can provide instructions to transmit sensor data generated by the IRB kit 200 to the C/O system 114 and/or one or more other IRB kits 200. As another example, the one or more processing units 204 can provide instructions to receive sensor data generated by the one or more other IRB kits 200. As another example, the one or more processing units 204 can provide instructions to receive road state data generated by the C/O system and/or the one or more other IRB kits 200.

In some implementations, the one or more processing units 204 are configured to determine the road state (and provide corresponding road state data) based on sensor data generated by the IRB kit 200 and/or sensor data generated by one or more other IRB kits 200. In this manner, the IRB kit 200 can process sensor data locally at a road barrier without sending the sensor data to a cloud server located remotely from the roadway. For example, in low latency use cases, the one or more processing units 204 can determine the comprehensive road state based on the sensor data within a predetermined period of time. The IRB kit 200 can send the road state information to a nearby agent such that the nearby agent is aware of the road state information, and/or one or more other IRB kits, and/or the C/O system 114.

In some implementations, the one or more processors of a first IRB kit can determine that the road state determined based on sensor data obtained by the first IRB kit is incomplete or indefinite. By way of non-limiting example, an example road state can indicate that the likelihood of a road construction on a roadway is 50%. In response, the communication unit of the first IRB kit can send an instruction to a second IRB kit. In this example, and in response to the instruction, the second kit can determine an updated road state based on sensor data obtained by the second IRB kit, and the updated road state can be more accurate than the road state generated by the first IRB kit. In some implementations, the communication unit of the first IRB kit can send the sensor data obtained by the first IRB kit to the second IRB kit. The second IRB kit can determine the updated road state based on the sensor data obtained by the first IRB kit and sensor data obtained by the second IRB kit.

In some implementations, the one or more processors 204 can be configured to calculate characteristics representative of vehicular traffic (e.g., vehicle density per unit area, vehicle congestion, vehicle headway, vehicle dynamics). For example, the one or more processors 204 can process sensor data to identify an object as the object enters a field of view of the respective IRB kit 200, or the IRB kit that sent the sensor data. Based on the identification of the object, the one or more processors 204 can further process sensor data to assess locations of vehicles along the configured roadway, speeds of the vehicles, relationships between vehicles (e.g., vehicle headway describing distance and time between two moving vehicles), and others, to name a few examples.

In some examples, the power unit 208 is configured to supply power for the IRB kit 200. In some implementations, the IRB kit is a self-contained system without a need for external power (e.g., wired connection to a power source). The road barriers with the kits installed are movable and can be easily relocated as needed. For example, the power unit can include a solar panel and a battery for all day and backup power. In some implementations, the IRB kit 200 can be connected to an external power supply. For example, the power unit can 208 include a power cable microtrenched below or within the respective road barrier.

In some examples, the communication unit 210 is configured to transmit and/or receive data. The data can include data generated by sensors (sensor data) and/or data generated by processing sensor data (e.g., data representative of a road state). For example, the communication unit 210 can send data to and/or receive data from the C/O system 114. As another example, the communication unit 210 can send data to and/or receive data from one or more other IRB kits 200. In some implementations, a plurality of IRB kits 200 can communicate with one another as at least part of a mesh network. For example, the communication units 210 of the plurality of IRB kits 200 can relay data until the data arrives at an IRB kit 200 that is connected to a cellular network, where the data can be sent to the C/O system 114 through the cellular network. In some implementations, the mesh network can further include one or more agents (e.g., vehicles) traveling on the roadway that can relay the data among the one or more agents and/or the IRB kits 200 in the IRB system 100. In some implementations, the communication unit 210 can include a wired communication device (e.g., fiber optic cable, cable internet) microtrenched below or within the respective road barriers. In some examples, the communication unit 210 can include short-range communication devices. Example short-range communication devices can include, without limitation, ultra-wideband (UWB), Wi-Fi, ZigBee, Bluetooth, and so on the like. The agent includes a communication unit configured to receive road state data from one or more of such short-range communication devices.

In some implementations, the communication unit 210 can be configured to receive information from an agent traveling on the roadway near the barrier. An agent (e.g., an autonomous vehicle) can include sensors configured to capture information of the environment. The agent can generate road state data based on the sensor data captured by the sensors of the agent. The agent can send sensor data and/or road state data to one or more IRB kits 200 in the IRB system 100. The IRB system 100 can aggregate the information received from the agent and sensor data obtained by the IRB kits 200.

In some implementations, one or more IRB kits 200 include the state conveyance system 212. In general, the state conveyance system 212 enables road state information to be communicated to one or more agents (e.g., vehicles). In some examples, the state conveyance system 212 includes a display device configured to display data indicative of the road state determined based on the sensor data. The display device can display the road state information to an agent that is able to observe the display device, such that the agent can make autonomous or semi-autonomous decisions based on the road state information. The data indicative of the road state can be in any type of formats, such as a QR code, a text message, an image, or a video. In some implementations, the display device can be configured to display data that is not readable by a human driver. The display device can include any appropriate type of display device. For example, the display device can be a light-emitting display device (e.g., a backlit display) or a non-light-emitting display device (e.g., an electronic ink (e-ink) device).

For example, the display device can be installed on one side of a jersey barrier. The display device can display an icon indicating a road state of the roadway. A camera of an autonomous vehicle traveling on the roadway can capture an image of the icon displayed on the display device. An on-board system of the vehicle can analyze the camera image and determine the road state information encoded in the icon. The autonomous vehicle can make autonomous driving decisions based on the road state information determined from the camera image of the icon.

As another example, the display device can display a text message indicating a road state of the roadway. A human driver of a traditional vehicle traveling on the roadway can recognize the text message. The human driver can make driving decisions based on the text message. For example, the human driver can determine to slow down, if the text message indicates that the roadway in 50 meters has an icy road surface.

In some implementations, the display device can be external to the state conveyance system 212 of the IRB kit 200. For example, the display device can hang from an overpass such that a driver or a sensor of a vehicle is not required to be looking or sensing in the direction of the IRB kit 200. The display device hanging from the overpass can receive a message from a respective state conveyance system 212 of the IRB kit 200 (e.g., warning drivers of some road condition) and display the message.

Figure 3:
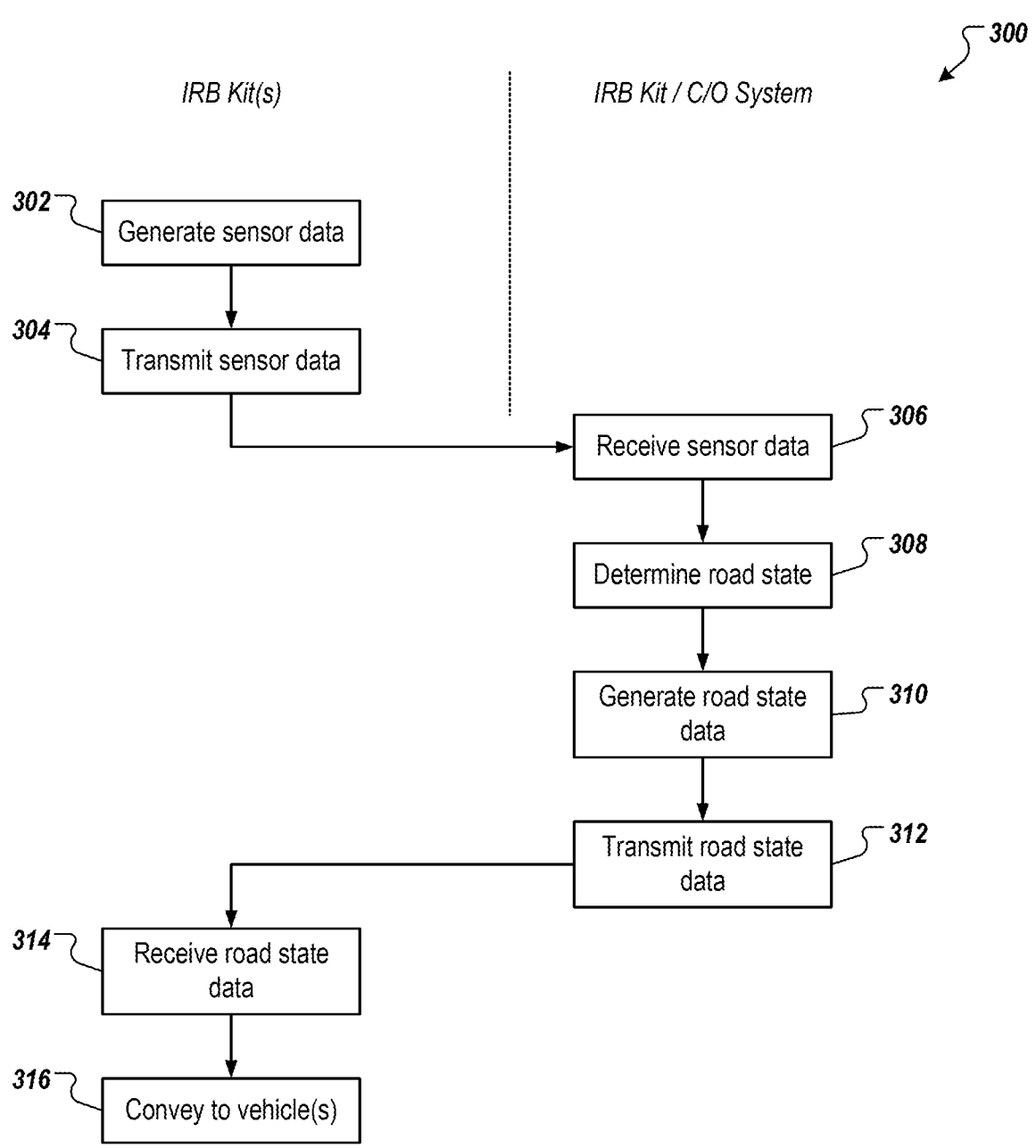
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

Sensor data is generated (302). For example, and as described herein, sensors the set of sensors of one or more IRB kits in an IRB system are responsive to characteristics of a roadway and generate sensor data that is representative of the characteristics. Example characteristics can include, without limitation, presence of objects (e.g., vehicles), speed and location of objects relative to the roadway, environmental characteristics (e.g., temperature, pressure, precipitation), and infrastructure characteristics (e.g., damage on roadway). The sensor data is transmitted (304). For example, and as described herein, each of the one or more IRB kits transmits sensor data to one or more other IRB kits and/or a C/O system.

The sensor data is received (306). For example, and as described herein, at least one of the other IRB kit and/or the C/O system receives sensor data. A road state is determined (308). For example, and as described herein, the at least one of the other IRB kits and/or the C/O system processes the sensor data to determine the road state of the roadway. Road state data is generated (310). For example, and as described herein, the at least one other IRB kit and/or the C/O system generates the road state data, which is representative of the road state. For example, and without limitation, the road state data can indicate a configuration of the roadway, which can include one or more general-purpose lanes and one or more dedicated lanes. The road state data is transmitted (312). For example, and as described herein, the at least one other IRB kit and/or the C/O system transmits the road state data to one or more IRB kits.

The road state data is received (314). For example, and as described herein, at least one IRB kit receives the road state data. The road state data is conveyed to one or more vehicles (316). For example, and as described herein, the at least one IRB kit conveys the road state data to the one or more vehicles. Continuing with the non-limiting example above, autonomous vehicles and/or semi-autonomous vehicles can receive the road state data to enable operation within a dedicated lane indicated within the road state data.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium) for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. An intelligent road barrier (IRB) system, comprising:
a plurality of road barriers located along a roadway;
a plurality of IRB kits, each IRB kit being removably attached to a respective road barrier and comprising:
    a set of sensors configured to obtain sensor data representative of at least a portion of a road state of the roadway proximate to the respective road barrier,
    one or more processors configured to process at least a portion of the sensor data,
    a communication unit configured to send the at least a portion of the sensor data to one or more other IRB kits and to receive sensor data from the one or more other IRB kits, and
    a state conveyance system configured to convey at least a portion of road state data to one or more vehicles associated with the roadway, the at least a portion of road state data being determined based on the at least a portion of the sensor data; and
a control and orchestration system configured to:
    determine that a likelihood score of a first road state determined based on first sensor data of the roadway obtained by a first IRB kit of the plurality of IRB kits is less than a threshold, and
    in response to determining that the likelihood score of the first road state is less than the threshold, send an instruction to a second IRB kit of the plurality of IRB kits, wherein the second IRB kit obtains second sensor data of the roadway in response to receiving the instruction, a second road state is determined based on at least the second sensor data obtained by the second IRB kit, and a likelihood score of the second road state is equal to or higher than the threshold.

2. The IRB system of claim 1, wherein the set of sensors comprises one or more of a light detection and ranging (LIDAR) system, a microphone, a camera, a hyper-spectrum camera, a radar, a Bluetooth system, a Wi-Fi system, a thermometer, a barometer, and a precipitation sensor.

3. The IRB system of claim 1, wherein the road state data is representative of the road state of the roadway and comprises respective states of agents on the roadway.

4. The IRB system of claim 1, wherein the road state data is representative of the road state of the roadway and comprises a state of the roadway.

5. The IRB system of claim 1, wherein the one or more processors are configured to determine at least a portion of the road state based on the sensor data within a predetermined period of time.

6. The IRB system of claim 1, wherein the control and orchestration system is provisioned as a cloud-based system and is configured to:
    coordinate temporal-spatial sensor information of the sensor data obtained by sensors of the plurality of IRB kits;
    determine second data representative of a road state determined based on the sensor data; and
    sending the second data to the communication unit of a particular IRB kit of the plurality of IRB kits.

7. The IRB system of claim 1, wherein at least one IRB kit comprises a power unit configured to supply power for the at least one IRB kit.

8. The IRB system of claim 7, wherein the power unit comprises a power cable and the communication unit comprises a wired communication device, and the power cable and the wired communication device are microtrenched below or within the respective road barrier.

9. The IRB system of claim 7, wherein the power unit comprises a solar panel and a battery.

10. The IRB system of claim 1, wherein two or more of the IRB kits communicate with one another to form a mesh network.

11. The IRB system of claim 1, wherein the state conveyance system comprises a short-range communication device configured to transmit the at least a portion of road state data to a vehicle on the roadway.

12. The IRB system of claim 1, wherein the communication unit is configured to receive information from a vehicle traveling on the roadway.

13. The IRB system of claim 1, wherein the road state comprises two or more different configurations of the roadway, comprising: a first configuration designating a lane of the roadway during a first time as a dedicated lane, the dedicated lane for travel of one or more of autonomous vehicles and semi-autonomous vehicles, and a second configuration designating the lane of the roadway as a general-purpose lane during a second time.

14. The IRB system of claim 1, wherein the second road state is determined based on both the first sensor data obtained by the first IRB kit and the second sensor data obtained by the second IRB kit.

15. An intelligent road barrier (IRB) system, comprising:

a plurality of road barriers located along a roadway;

a set of IRB kits, each IRB kit being removably attached to a respective road barrier and comprising:

a set of sensors configured to obtain sensor data representative of at least a portion of a road state of the roadway proximate to the respective road barrier, the at least a portion of a road state comprising states of respective vehicles traveling on the roadway, one or more processors configured to process at least a portion of the sensor data, a communication unit configured to send the at least a portion of the sensor data to one or more other IRB kits and to receive sensor data from the one or more other IRB kits, and a state conveyance system configured to convey at least a portion of road state data to one or more vehicles associated with the roadway, the at least a portion of road state data being determined based on the at least a portion of the sensor data; and a control and orchestration system configured to:

determine that a likelihood score of a first road state determined based on first sensor data of the roadway obtained by a first IRB kit of the set of IRB kits is less than a threshold, and in response to determining that the likelihood score of the first road state is less than the threshold, send an instruction to a second IRB kit of the set of IRB kits, wherein the second IRB kit obtains second sensor data of the roadway in response to receiving the instruction, a second road state is determined based on at least the second sensor data obtained by the second IRB kit, and a likelihood score of the second road state is equal to or higher than the threshold.

16. The IRB system of claim 15, wherein each IRB kit further comprises a fastening system that enables the IRB kit to be removably fastened to the respective road barrier.

17. The IRB system of claim 15, wherein two or more of the IRB kits communicate with one another to form a mesh network, only one IRB kit in the mesh network conveying the at least a portion of road state data to the one or more vehicles.

18. The IRB system of claim 15, wherein a first IRB kit in the set of IRB kits has capabilities that are different from capabilities of a second IRB kit in the set of IRB kits.

19. The IRB system of claim 18, wherein the first IRB kit has greater computer processing capacity than the second IRB kit.

20. The IRB system of claim 15, wherein the state conveyance system comprises a short-range communication device configured to transmit the at least a portion of road state data to a vehicle on the roadway.

* * * * *